(12) United States Patent
Petrov

(10) Patent No.: US 10,982,643 B1
(45) Date of Patent: Apr. 20, 2021

(54) UNDERWATER TURBINE APPARATUS AND METHOD

(71) Applicant: DIMITRI PETROV CONSULTANTS INC., Montreal (CA)

(72) Inventor: Dimitri Petrov, Quebec (CA)

(73) Assignee: Dimitri Petrov Consultants Inc., Montreal (CA)

( * ) Notice: Subject to any disclaimer, the term of this patent is extended or adjusted under 35 U.S.C. 154(b) by 0 days.

(21) Appl. No.: 16/925,994

(22) Filed: Jul. 10, 2020

(51) Int. Cl.
  *F03B 13/10* (2006.01)
  *F03B 3/06* (2006.01)
  *F03B 3/14* (2006.01)
  *F03B 15/00* (2006.01)

(52) U.S. Cl.
  CPC ............... *F03B 13/10* (2013.01); *F03B 3/06* (2013.01); *F03B 3/14* (2013.01); *F03B 15/00* (2013.01); *F05B 2210/11* (2013.01); *F05B 2220/32* (2013.01); *F05B 2240/14* (2013.01); *F05B 2240/95* (2013.01)

(58) Field of Classification Search
  CPC ...... F03B 13/10; F03B 15/00; F05B 2240/95; F05B 2210/11; F05B 2240/14; F05B 2220/32
  USPC ..................................... 416/417; 290/43, 54
  See application file for complete search history.

(56) References Cited

U.S. PATENT DOCUMENTS

| 4,181,455 A * | 1/1980 | Stanwick | E21B 7/124 114/293 |
| 4,215,544 A * | 8/1980 | Stanwick | E21B 7/124 114/295 |
| 8,575,775 B1 * | 11/2013 | Gonzalez-Carlo | F03B 17/061 290/54 |
| 9,784,236 B2 * | 10/2017 | Masek | F03B 3/04 |
| 2010/0135766 A1 * | 6/2010 | Allaei | F03D 9/257 415/1 |
| 2010/0148513 A1 * | 6/2010 | Susman | F03B 13/264 290/54 |
| 2010/0276935 A1 * | 11/2010 | Dehlsen | F03B 13/00 290/54 |
| 2011/0200425 A1 * | 8/2011 | Weaver | F03D 80/70 415/7 |
| 2012/0056424 A1 * | 3/2012 | Holstein | H02P 3/02 290/43 |
| 2012/0119500 A1 * | 5/2012 | Christopher | H02K 7/1823 290/54 |
| 2015/0008676 A1 * | 1/2015 | Duchene | H02K 7/09 290/54 |
| 2015/0354528 A1 * | 12/2015 | Van Rompay | F03B 3/00 290/54 |

(Continued)

*Primary Examiner* — Charles Reid, Jr.
(74) *Attorney, Agent, or Firm* — Taft Stettinius & Hollister LLP; Ryan O. White; Derek B. Lavender

(57) ABSTRACT

An underwater turbine apparatus includes a nacelle, containing a generator; a rotor connected to a first end of the nacelle and in communication with the generator to cooperate therewith to convert kinetic energy to electrical energy; a float connected to the nacelle; and a stabilizer connected to the nacelle; a tower connected to the nacelle by a joint; a base supporting the tower; an auger protruding from the underside of the base; and a motor for driving the auger, operable to drill the auger into engagement with an installation surface for the underwater turbine. A method for installing an underwater turbine apparatus includes rotating an auger, on the underwater turbine apparatus, to engage a seafloor.

21 Claims, 8 Drawing Sheets

(56) References Cited

U.S. PATENT DOCUMENTS

2018/0372061 A1* 12/2018 Vamvas .................. B63B 35/44
2020/0318602 A1* 10/2020 Sheldon-Coulson ........................
G05D 1/0055

* cited by examiner

UNDERWATER TURBINE APPARATUS AND METHOD

TECHNICAL FIELD

The present invention relates to turbines in general, and underwater turbines in particular.

BACKGROUND

Underwater turbines use the kinetic energy of tidal and river flow to generate electricity. Due to the complexity of such aquatic environments, installation, maintenance, and recovery costs are significant. As such, there is a demand for an underwater turbine that is able to efficiently convert tidal flow into electricity.

A problem with underwater turbines is selecting the direction in which to orient the rotors, given that the direction of flow at any given point may change dramatically over the course of a tidal cycle. The efficiency with which an underwater turbine can generate electricity depends, in part, on the angle at which the rotor meets the direction of flow.

SUMMARY OF INVENTION

In accordance with a broad aspect of the present invention, there is provided an underwater turbine apparatus, comprising: a nacelle assembly, including a nacelle, containing a generator; a rotor connected to a first end of the nacelle and in communication with the generator to cooperate therewith to convert kinetic energy to electrical energy; a float connected to the nacelle; and a stabilizer connected to the nacelle; a tower connected to the nacelle by a joint; a base with an upperside and an underside, the base supporting the tower in an operative position extending from the upperside; an auger having a long axis and being rotatable about the long axis, the auger protruding from the underside of the base; and a motor for driving the auger about its long axis, operable to drill the auger into engagement with an installation surface for the underwater turbine.

In accordance with another broad aspect of the present invention, there is provided a method for installing an underwater turbine apparatus, comprising rotating an auger, on the underwater turbine apparatus, to engage a seafloor.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF EMBODIMENTS

Figure 1:
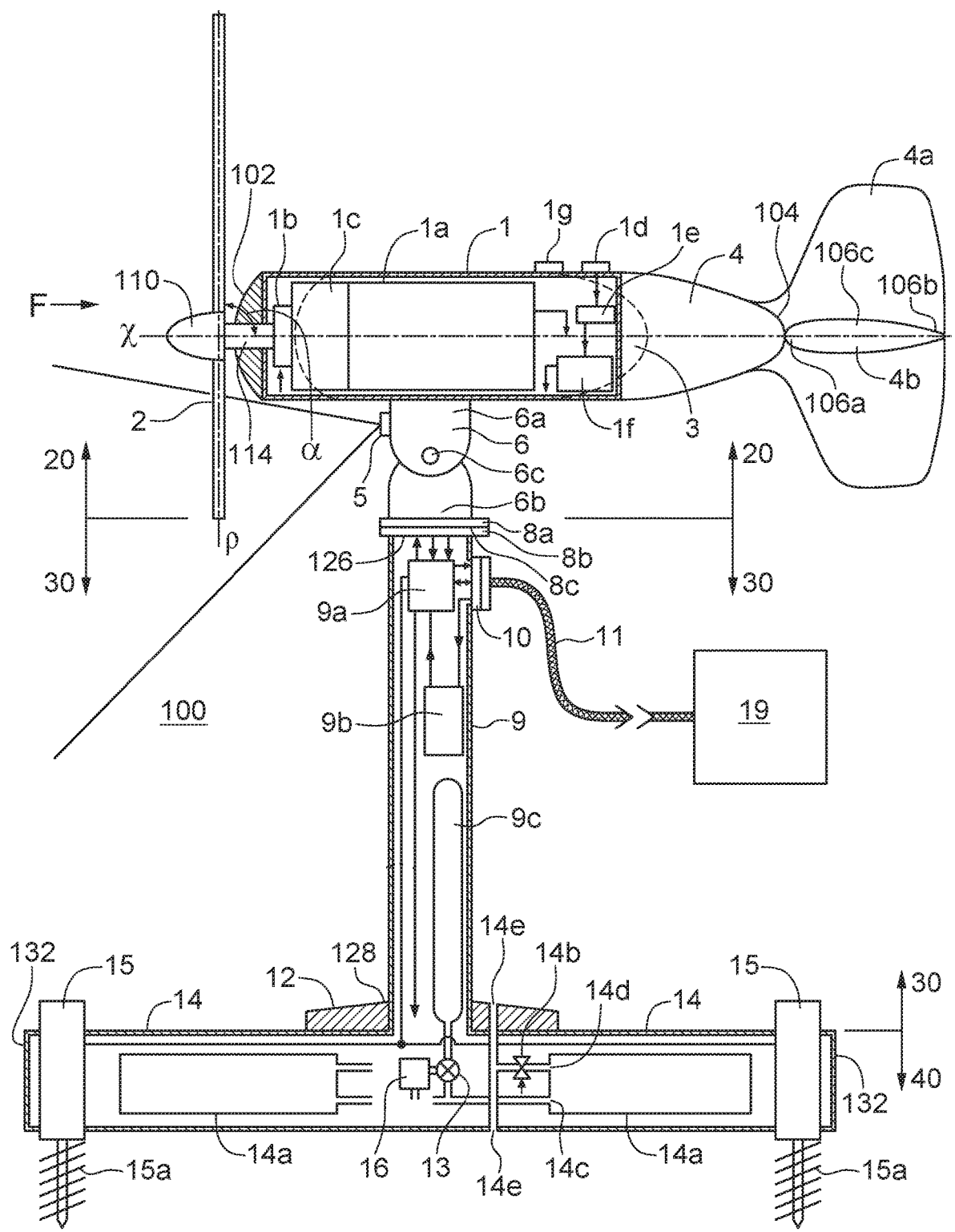
FIG. 1 is a side elevation view of an underwater turbine according to one embodiment of the present invention;
(b)

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention provides, one or more of various advantages, such as an underwater turbine apparatus that can adjust the orientation of the rotor according to the direction of water flow, an apparatus that can be conveniently anchored to the water body floor. In this specification, reference is made to an ocean installation, where a sea floor and tidal streams are used as examples. However, it is to be understood that the apparatus could also be used in other bodies of water, including rivers.

With reference to FIGS. 1-7, an underwater turbine apparatus 100 includes a nacelle assembly 20, a tower assembly 30, and a support assembly 40. The nacelle assembly 20 includes a nacelle 1 for housing a generator 1a and various other components, described further below. Support assembly 40 is attachable to and detachable from a seafloor of the environment. Tower assembly 30 connects nacelle assembly 20 to support assembly 40. The underwater turbine apparatus 100 may be in communication with a shore station 19, for example using a physical connection such as cable 11. While this specification describes various elements as being in one of the nacelle assembly, the tower assembly, or the support assembly, it is to be appreciated that such locations are optional and such parts may be elsewhere on the turbine.

Nacelle assembly 20 may include a nacelle 1, which acts as a housing. The nacelle may act as a shell with components disposed therein. Nacelle 1 may have a shape resembling a spheroid, for example, a torpedo. The nacelle may resemble and/or act as, for example, a windvane, an anemometer, and/or a dart; and stabilizers (discussed further below) may resemble and/or act as the flight of the same. Nacelle 1 may have a substantially cylindrical, elongate body extending from a front end 102 to a rear end 104, thereby defining an axis x. One or both ends may be rounded. One or both ends may be tapered. For example, a diameter of a tail 4 of the nacelle may gradually decrease towards rear end 104. In one embodiment, front end 102 may be shaped substantially as a spheroid, rear end 104 may be tapered, for example being substantially shaped as a cone, and there may be a substantially cylindrical section therebetween.

Figure 2:
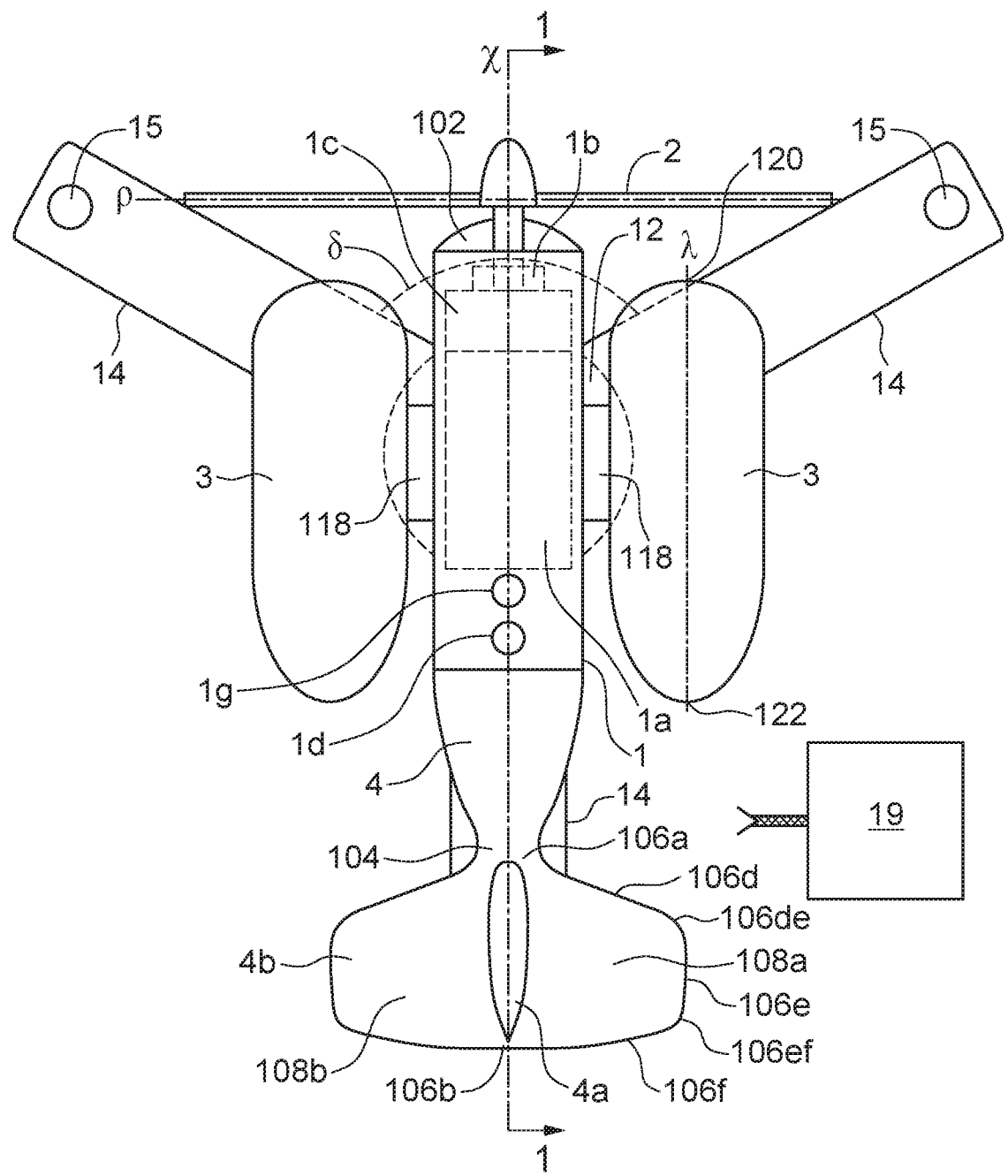
FIG. 2 is a plan view of the embodiment of FIG. 1;
(c)

The nacelle may be coupled to one or more floats. The floats may act to keep the nacelle level with respect to axis x, and/or to keep the nacelle substantially above the tower assembly and the support assembly. In one embodiment, as illustrated in FIG. 2, there are two floats 3, one on either side of nacelle 1, each connected to nacelle 1 by an arm 118. The floats may be buoyant. Floats 3 may have a shape resembling a spheroid or ellipsoid, for example, a torpedo. Each float may be shaped in a streamlined fashion, and may be parallel to axis x, facing a rotor plane p (discussed further below). Each float 3 may have a substantially cylindrical, elongate body extending from a first end 120 to a second end 122, thereby defining a long axis k. Axis X, of each float may be parallel to axis x of nacelle 1.

The volume and/or type of fluid or material in the floats may contribute to their buoyancy. These and other characteristics may be selected, for example, to provide desired buoyancy and/or to limit mechanical stress and strain on the rotating joint and/or universal joint, which may allow the components to last for a longer period of time.

Nacelle 1 may have attached thereto a stabilizer including one or more stabilizer fins 4a, 4b. In use, the stabilizer fins stabilize the pitch, roll, and/or yaw angles of the nacelle, streamlining the nacelle with forces in the environment, including fluid dynamics of tidal streams. Tidal streams may act on the stabilizers to pivot the nacelle such that its axis $\chi$ is substantially aligned with the direction of tidal flow. The nacelle stabilizers may align the nacelle with the direction of flow of tidal streams.

The stabilizer may be parallel to the axis x, with a neutral angle of attack. The stabilizer may be bisected by, and possibly symmetrical about, the axis x. A first stabilizer, such as a horizontal stabilizer 4a, may be substantially perpendicular to a second stabilizer, such as a vertical stabilizer 4b. The stabilizers may be configured as an empennage. For example, stabilizers 4a and 4b may together form an empennage with a cruciform arrangement (and/or a crosshair arrangement) substantially centered on axis x. Each stabilizer may be a substantially planar member with a fin/foil shape and/or may act as a foil. Each stabilizer fin may generate a low drag, having a symmetical foil shape. In a first cross section, as illustrated by vertical stabilizer 4b in FIG. 1, the stabilizer may have a teardrop shape, having a rounded, convex, for example substantially semi-cylindrical, first, leading end 106a extending to a narrower, for example v-shaped, tail edge at a second, trailing end 106b, with a tapering portion 106c in between. As such, the stabilizer in cross section may be rounded and thicker at first end 106a and have a thickness that gradually tapers into a point at the second end. In one embodiment, the stabilizers may resemble and/or act as the flight of a dart.

In plan view, or along a cross section perpendicular to the first cross section, the stabilizer may have a whale tail shape. The first end 106a may be connected to the rear end 104 of the nacelle. The stabilizer may have a first edge 106d extending from first end 106a at an angle between 0 and 90 degrees, for example 45 degrees, to a second edge 106e substantially parallel to axis $\chi$. Second edge 106e may extend to third edge 106f, substantially perpendicular to axis $\chi$.

The edges of the stabilizer may be rounded. For example, edge 106d may be concave, edge 106e may be convex, and/or edge 106f may be convex. The corners between edges may be rounded, for example, convex, as shown in in FIG. 1 by corner 106de between edges 106d and 106e, and by corner 106ef between edges 106e and 106f.

The stabilizer may be bilateral, that is, may have one side that is substantially a mirror image of the other, for example, side 108a and 108b, where side 108a includes edges 106d, 106e, and 106f, and side 108b is a mirror image on the other side of axis $\chi$ from side 108a.

Nacelle 1 may be coupled to a rotor 2, for example at the front end 102 of the nacelle. Rotor 2 may be on the opposite end of nacelle 1 with respect to the one or more stabilizers. Rotor 2 may include a nose 110, with one or more blades, for example three blades 112, that may extend substantially radially therefrom, thereby defining a rotor plane p. Tidal flow may act on the stabilizers to orient the nacelle, and thereby the rotors and rotor plane p.

In use, rotor 2 may be acted upon by the tidal stream's flow. The flow causes the stabilizers to rotate and/or pivot the nacelle, which orients the rotors, and thereby affects how the flow acts upon the rotors. Nose 110 may be coupled to a generator 1a, for example by a shaft 114 and/or gearbox 1c, configured such that when a force F acts on the blades to cause the shaft 114 to rotate about the axis $\chi$, generator 1a converts the kinetic energy of the rotating shaft into electrical energy. Generator 1a and/or gearbox 1c may be disposed inside the nacelle. Shaft 114 may be partly inside and partly outside nacelle 1.

Each of the one or more blades 112 may extend from nose 110 in a direction substantially perpendicular to axis $\chi$. The position of rotor 2, for example an angle $\alpha$ of the blades 112 relative to axis $\chi$, may affect the yield of electrical energy generated by rotor 2 in cooperation with generator 1a. For example, rotor 2 facing the direction of flow may yield more electrical energy compared to rotor 2 facing another direction, such as a direction perpendicular to the direction of flow. Depending on operational conditions and any number of other factors, including flow rate, any number of positions of the blades 112 of the rotor 2 may be desired. As such, there is a need to control the angle $\alpha$ of the blades 112 relative to axis $\chi$. In one embodiment, the angle $\alpha$ of the blades relative to axis $\chi$ may be controlled by a blade pitch control 1b. Blade pitch control 1b may be connected to the rotor, for example to nose 110. Pitch blade control 1b may be configured to adjust angle $\alpha$, for example, according to one or more of: commands from a computer, user instructions, tidal schedule (which may be pre-programmed into the computer and/or its instructions), time, and flow rate.

The nacelle assembly may further include one or more sensors configured for detecting and/or recording data from the environment. Such sensors can include any one or more of: a flow meter; an ultrasonic sensor and transmitter for exchanging data with electronic interface 1f; a camera 5 that may include a light source; a pressure sensor for detecting changes in pressure in the nacelle, which may be caused by one or more of a leak, a temperature change, or a mechanical malfunction; a temperature sensor for sensing changes in temperature, which may be caused by friction of failing mechanical components; an accelerometer for detecting vibrations, which may be caused by failing mechanical components; and a compass and/or a gyroscope for detecting one or both of an orientation of the nacelle and a direction of tidal streams. One or more of the sensors may be in communication with a computer (such as the electronic interface) and/or one or more of the other sensors. One or more of the sensors may be disposed inside the nacelle. One or more of the sensors may be accessible from an exterior surface of the nacelle. In one embodiment, ultrasonic sensor 1*d* and/or flow meter 1*g* are disposed on an exterior surface 1*d* of nacelle 1, for example substantially on the top of nacelle 1 closer to end 104 than to end 102; and sensor suite 1*e* is inside of nacelle 1. In one embodiment, the sensor suite may include one or more of a pressure sensor, a temperature sensor, an accelerometer, and a north-seeking gyroscope. Ultrasonic detector 1*d*, flow meter 1*g*, and/or sensors of sensor suite 1*e* may be in communication with electronic interface 1*f*. The electronic interface may be configured to act as a computer and/or scanner, which in use may collect, record, and sample data collected by the various sensors, and may conduct other operations, which may be initiated by a computer 9*a*, such as controlling blade pitch control 1*b*.

Figure 3:
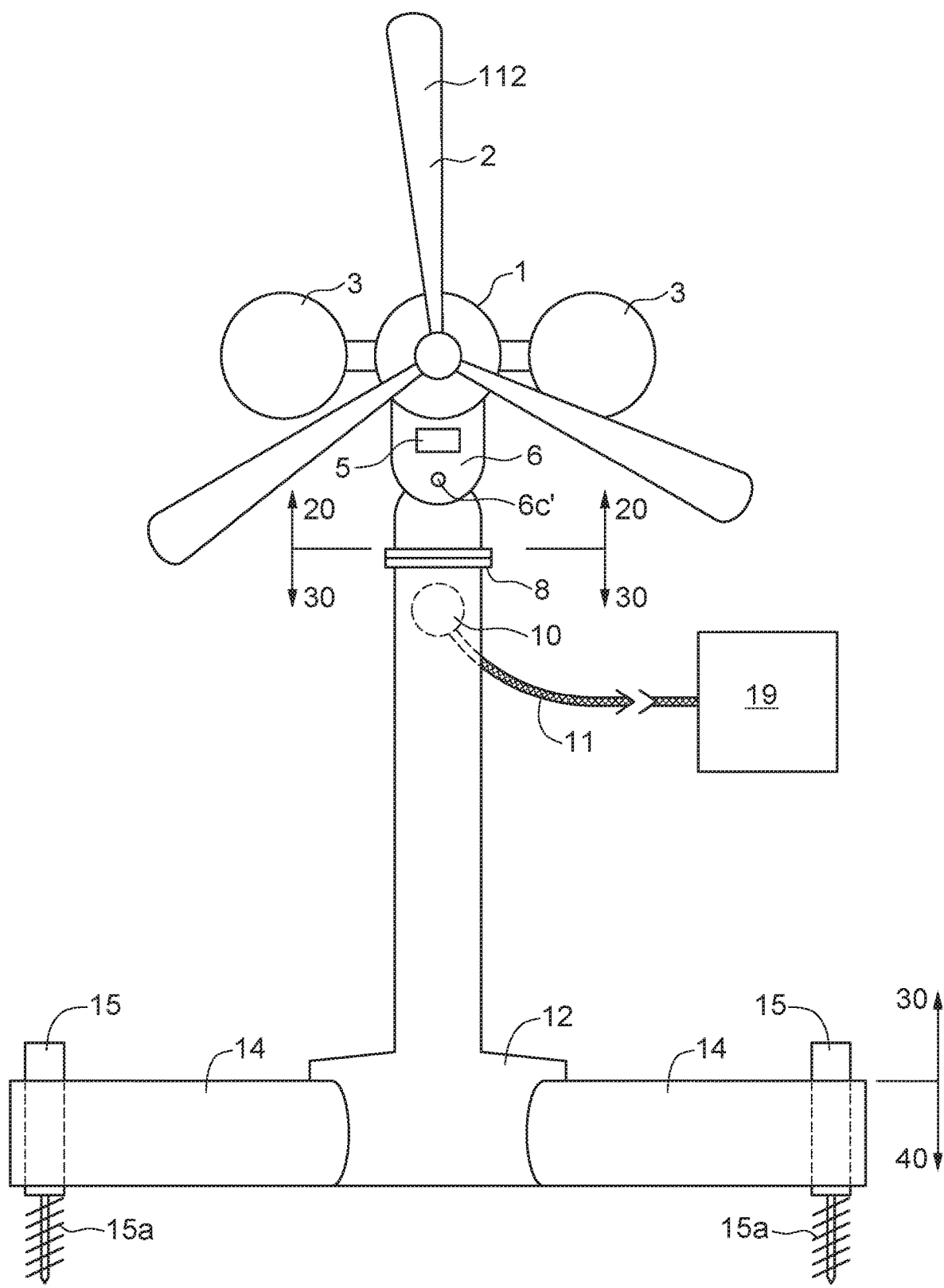
FIG. 3 is a front elevation view of the embodiment of FIG. 1;
(d)

Nacelle assembly 20 may include a joint for permitting the nacelle to rotate, for example at various angles relative to the tower, and/or around a number of axes, as illustrated in FIGS. 1 and 3. For example, the joint may be a universal joint 6, for connection to tower assembly 30. Universal joint 6 may have an upper shaft 6*a*, a lower shaft 6*b*, with a hinge 6*c* therebetween. Hinge 6*c* may permit adjustment of the pitch angle of the nacelle. Universal joint 6 may also include a hinge 6*c'*, between upper shaft 6*a* and lower shaft 6*b*, for adjusting the roll angle of the nacelle. Upper shaft 6*a* may be connected to nacelle 1 beneath a centre of mass of nacelle assembly 20. Lower shaft 6*b* may be connected to the tower assembly, for example, by an upper flange 8*a* of the rotating joint. The rotating joint may be used to adjust the yaw angle of the nacelle. Rotating joint 8 may also include a lower flange 8*b*, and a rotating joint interface 8*c* which may be between the upper flange and lower flange. Rotating joint 8 may be waterproof. Rotating joint 8 may include a slip ring assembly to permit conductors and other wiring to pass through the joint.

A camera, for example the camera 5, and/or a light source may be provided. For example, camera 5 and/or a light source may be disposed on the rotating joint 6, for example upper shaft 6*a*. It is to be understood that the camera and/or light source may be disposed elsewhere, for example, on the nacelle, the tower, and/or the support assembly. The camera may be configured to have a field of view able to capture a portion of the rotor and/or a portion of the seafloor. The camera may be configured to transmit captured data to shore station 19 via cable 11. This permits the apparatus to act as a marine field station, that is, the apparatus may collect data about the environment, for example how sea animals behave in the presence of the apparatus, and changes in seafloor topology caused by tidal streams.

Tower assembly 30 includes a tower 9, which is a structure for holding the nacelle assembly, for example, above support assembly 40, and which also may act as a housing for various components to be described in the following paragraphs. Tower 9 may have a substantially cylindrical, elongate body extending from an upper end 126 to a lower end 128. Upper end 126 may be connected to lower flange 8*b* of the rotating joint.

The computer may be disposed within tower 9. The computer may be configured to be an electronic control unit for controlling various other components, as described elsewhere in this specification.

The computer may be in signal transmissive communication with a shore station 19. In one embodiment, a port 10 is accessible from an exterior surface of tower 9. Cable 11 may extend out of port 10 to shore station 19. Cable 11 may be configured to allow signal transmissive communication between shore station 19 and the underwater turbine apparatus 100, including with the computer. Cable 11 may allow for electrical and/or optical communication from the apparatus 100 and the shore station 19. Cable 11 may be a fiber optic cable 11*a*. Cable 11 may be a wire. In one embodiment, a communication link between ultrasonic sensor 1*d* and an ultrasonic transmitter on a service vessel may be used instead of or in addition to cable 11, for example if cable 11 is damaged. Cable 11 may include conductors 11*c* for transmitting electrical energy from generator 1*a* to shore station 19.

Cable 11 may include conductors 11*b* for transmitting power from a grid network to an uninterruptible power supply (UPS) 9*b*, which may be disposed in tower 9. UPS 9*b* may act as backup power, for example, if power from the grid network is unavailable. UPS 9*b* may store power generated by the apparatus.

Tidal currents, among other environmental forces, may destabilize tower assembly 30. To mitigate such forces, the tower assembly may include a fairing to improve streamlining, reduce drag, and/or produce a downward stabilizing force. The fairing may be constructed out of any number of materials, including sheet metal, composite material, and/or structural foam. With reference to FIGS. 5*a*, 5*b*, 6, and 7, fairing 17 may be coupled to tower 9. In the illustrated embodiment, fairing 17 is rotatable around tower 9. Fairing 17 may be a structure that sleeves around tower 9. Fairing 17 may have a longitudinal opening sized to fit around a length of tower 9. Each end of fairing 17 may be coupled to tower 9 by a rotatable joint 18. Fairing 17 may be a wall around tower 9. Fairing 17 may be made of a sheet material, such as sheet metal. Fairing 17 may have an internal face 142 and an external face 140, internal face 142 facing an exterior surface of tower 9, and external face 140 facing outwards. In lateral cross section, fairing 17 may have a teardrop shape, with a rounded, for example semi-circular first side 134 and a v-shaped second side 136. Side 136 may converge to a trailing edge. Fairing 17 may have a radial length defined by the radial distance between the external face and the center point of the tower. Face distance of fairing 17 may be smallest at a middle section 138 between sides 134 and 136, relative to a medium radial length at side 134, and a largest radial length to the pointed trailing edge defined by side 136. In use, fairing 17 may be acted upon by fluid flow such that side 134 points upstream into the fluid flow and side 136 may point substantially downstream with the direction of flow F', thereby acting as a vane and improving the hydrodynamics of tower 9 by reducing drag. Fairing 17 may be rotatable around tower 9, as per the operation at rotatable joints 18, to permit the leading side, for example side 134 to rotate such it is directed upstream, improving hydrodynamics of the apparatus.

Fairing 17 may have connected thereto one or more fairing stabilizers 17*a*. The fairing stabilizer may be coupled to the fairing such that the fairing stabilizer extends from both sides of middle section 138. The fairing may thereby bisect the fairing stabilizer into two halves that are substantially mirror images of each other. Each fairing stabilizer 17*a* may be a planer member, with a substantially rectangular shape in plan view, having two pairs of substantially parallel edges, such as a first pair of parallel edges 154 and 156, and a second pair of parallel edges 144 and 146. The first pair may be perpendicular to the second pair. Fairing stabilizer 17*a* may be shaped as a foil, having a substantially hydrofoil vertical cross section, for example, with edge 154 being substantially v-shaped and edge 156 being rounded.

Fairing stabilizers 17*a* may be angled relative to horizontal such that one edge is lower than the other with respect to the tower 9 and fairing 17. For example, edge 156 may be lower than edge 154 and thereby have an angle of attack for passing water, for example in the tidal stream. The fairing stabilizer 17a may have a stabilizer centre line 148 parallel to sides 144 and 146, and equidistant therebetween. Fairing 17 may have a fairing centre line 150 extending laterally from side 134 to side 136. From an elevation perspective, centre lines 150 and 148 may meet at an angle β, which may be between 0 and 90 degrees. In use, with side 136 of the fairing pointing substantially in the direction of flow, the flow meets upper face 160 of fairing stabilizer 17a, the force of flow and the fairing stabilizer cooperating to exert a downward force on the apparatus, thereby driving the apparatus toward the seafloor. The fairing stabilizers may deflect oncoming fluid, resulting in a force on the fairing stabilizers in the direction opposite to the deflection. With a leading edge, for example edge 156, lower than a trailing edge, for example edge 154, oncoming flow can cause lower pressure beneath the fairing stabilizer relative to higher pressure above the fairing stabilizer, causing downforce on the stabilizer thereby anchoring the apparatus.

Figure 8A:
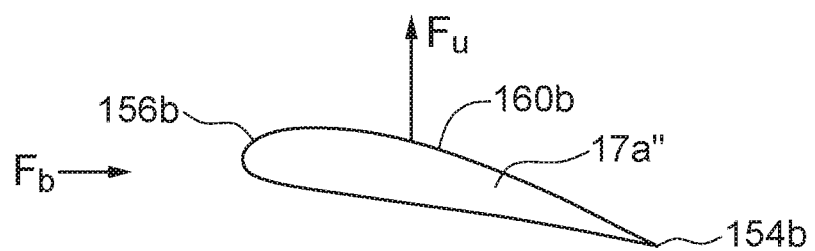
FIG. 8A is a side elevation cross-sectional view of a fairing stabilizer according to one embodiment of the present invention; and
(j)
Figure 8B:
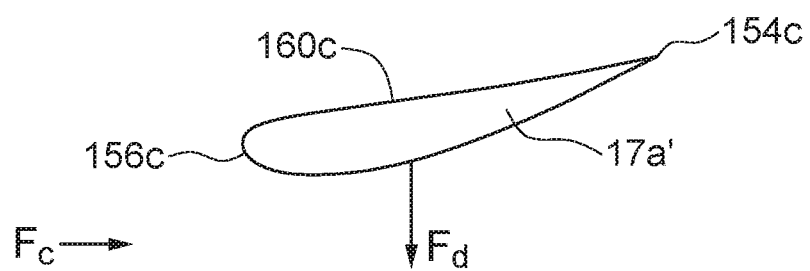
FIG. 8B is a side elevation cross-sectional view of a fairing stabilizer according to another embodiment of the present invention.

FIG. 8A illustrates a cross sectional view of one embodiment of a hydrofoil 17a". Hydrofoil 17a" includes leading edge 156b, upper face 160b, and trailing edge 154b, with hydrofoil 17a" being angled such that leading edge 156b is above trailing edge 154b. Sideways fluid flow Fb acts on hydrofoil 17a" to generate upward force Fu. FIG. 8B illustrates a fairing stabilizer 17a' that is substantially a mirror image of hydrofoil 17a". Hydrofoil 17a' includes leading edge 156c, upper face 160c, and trailing edge 154c, with stabilizer 17a' being angled such that leading edge 156c is lower than trailing edge 154c. Sideways fluid flow Fc acts on stabilizer 17a' to generate downward force Fd. Forces Fu and Fd may have the same magnitude but act in opposite directions.

Support assembly 40 is a base to support the tower and nacelle substantially thereabove. Support assembly 40 includes struts 14. Each strut may extend radially from tower 9 proximate, for example beneath, lower end 128 of tower 9 to an end 132 of the strut. In the illustrated embodiment, three struts 14 extend radially from tower 9, each strut coupled to tower 9 substantially at an angle δ from the other struts, for example, angle δ being approximately 120 degrees, as illustrated in FIG. 2. That is, the struts 14 may be spaced substantially equally apart.

Struts 14 may act as a housing for various components to be described in the following paragraphs. Struts 14 may have a substantially cylindrical, elongate body. Struts 14 may open into tower 9 on one end, and be closed on end 132. The struts may be coupled to tower 9 by a hub 12. Hub 12 may sleeve around a portion of lower end 128 of tower 9, and also sleeve around a portion of each strut where it meets tower 9.

One or more of the struts 14 may be securable to a surface, such as a seafloor. For example, a strut 14 of the struts may include an auger 15a, which may be driven to rotate about its long axis by a motor 15. Auger 15a, acting in a manner similar to a helical drill bit, may be used to engage the surface, for example the seafloor, to anchor the strut to the surface. When the auger is in contact with the seafloor and is rotated, it drills into, and becomes embedded in, the seafloor. Each auger 15a extends from the underside of the strut on which it is secured, thereby extending in a direction opposite from tower 9. Auger 15a may be positioned radially distal from tower 9, for example proximate end 132 of strut 14. There may be an auger on each strut. In one embodiment, the one or more augers may be oriented with their long axis all substantially parallel with each other and with the long axis of the tower. Auger 15a may be coupled to motor 15 so that auger 15a may be driven thereby to rotate about its long axis. Motor 15 may be coupled to the strut, for example at or near end 132. Motor 15 may drive the auger forwardly, to drill into a surface the tip of the auger touches, and possibly also in the reverse, to back the auger out of engagement with a surface. The auger tip may be sharpened to facilitate the drilling operation. Motor 15 may receive power from UPS 9b via wiring between motor 15 and UPS 9b, and/or the shore station via cable 11 and wiring between cable 11 and motor 15.

The underwater turbine apparatus may be submersible. The underwater turbine may include a submerge apparatus, which allows the turbine to be moved from a floating position to a submerged position. Thus, the underwater turbine can be conveniently floated to a location of interest and then submerged.

The submerge apparatus may employ a ballast tank system, whereby one or more ballast tanks are filled with water to submerge the apparatus toward the seafloor. Thus, a ballast tank that is originally substantially empty can be filled with water to cause the turbine to sink. In one embodiment, there is a ballast tank 14a in the lower part of turbine such as in or on the support assembly. For example, one or more of the struts 14 may include ballast tanks 14a, which may be disposed within the struts.

If it is desired to also be capable of emptying the ballast tank, the ballast tank may have a purge system. If desired, therefore, ballast tanks may be filled with air to float the apparatus toward the water's surface. One or more tanks, for example tank 9c, may contain compressed air. The expansion of the compressed air may affect the buoyancy of the turbine. For example, the submerge apparatus may include a tank 9c, which may contain a fluid, for example compressed air that is capable of purging water from the one or more tanks 14a. Tank 9c may be configured to deliver compressed air to a ballast tank 14a of the submerge apparatus. Tank 9c may be disposed in tower 9, for example closer to end 128 than to end 126. Tank 9c may be closer to the support assembly than to the nacelle assembly. While tank 9c may be disposed in the tower assembly, as illustrated in FIG. 1, it is to be understood that the tank may be elsewhere, including without limitation in one of the struts, or in the nacelle. Likewise, while ballast tanks 14a may be disposed in the struts, as illustrated in FIG. 1, it is to be understood that the ballast tanks may be elsewhere, including without limitation in the tower.

Figure 4:
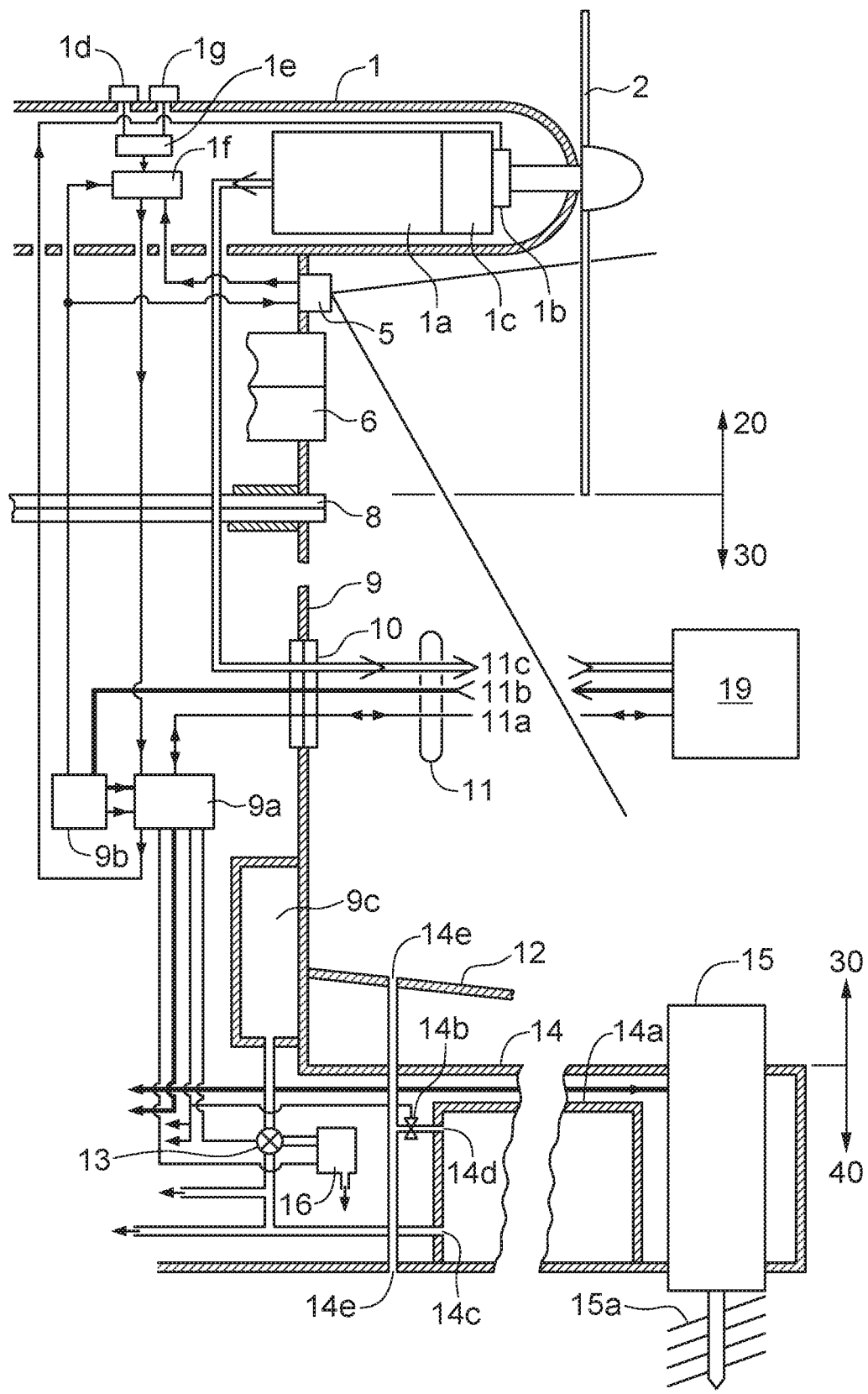
FIG. 4 is partly cutaway cross-sectional functional schematic of the embodiment of FIG. 1 substantially along line 1-1 of FIG. 2;
(e)
Figure 5A:
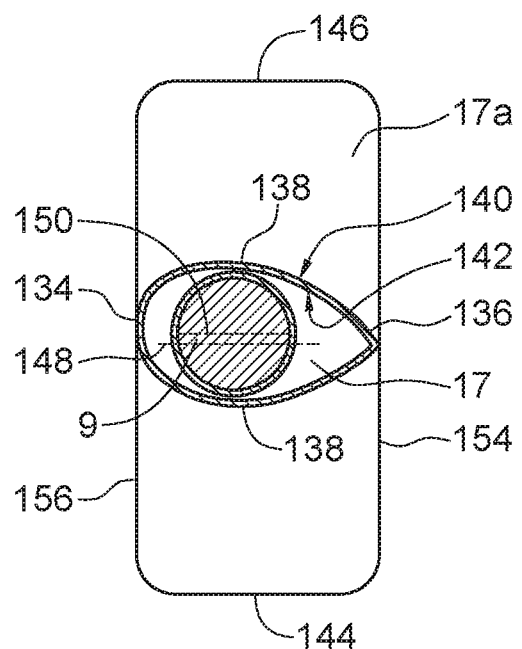
FIG. 5a is a plan view of a fairing according to one embodiment of the present invention;
(f)
Figure 5B:
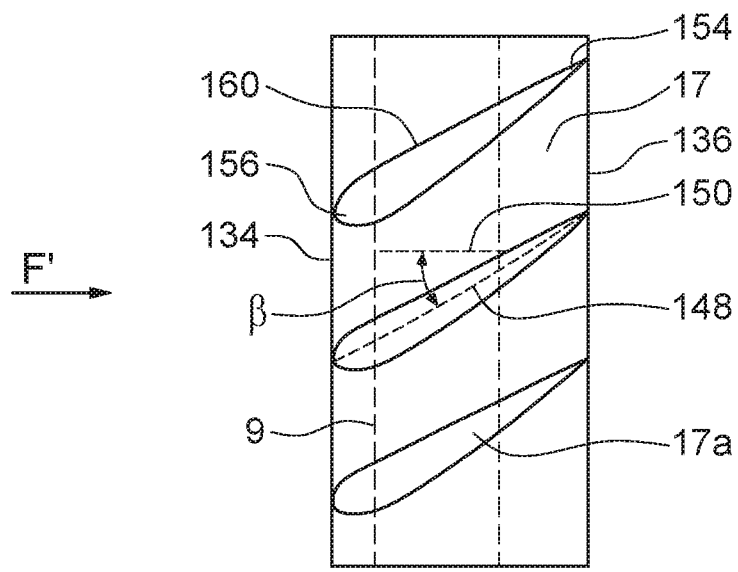
FIG. 5b is a side elevation view of the fairing of FIG. 5a;
(g)
Figure 6:
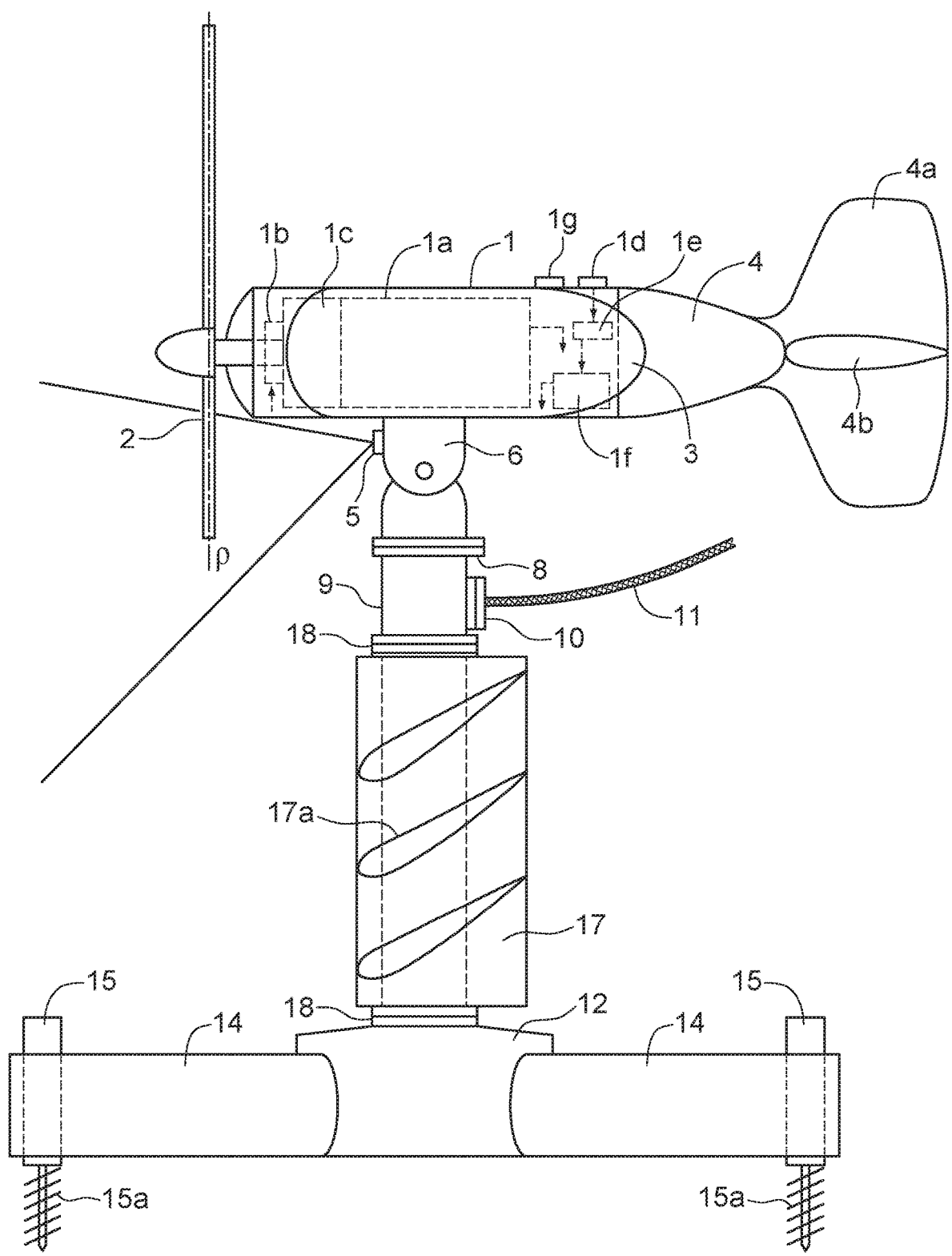
FIG. 6 is a side elevation view of an underwater turbine according to a second embodiment of the present invention, including a fairing;
(h)
Figure 7:
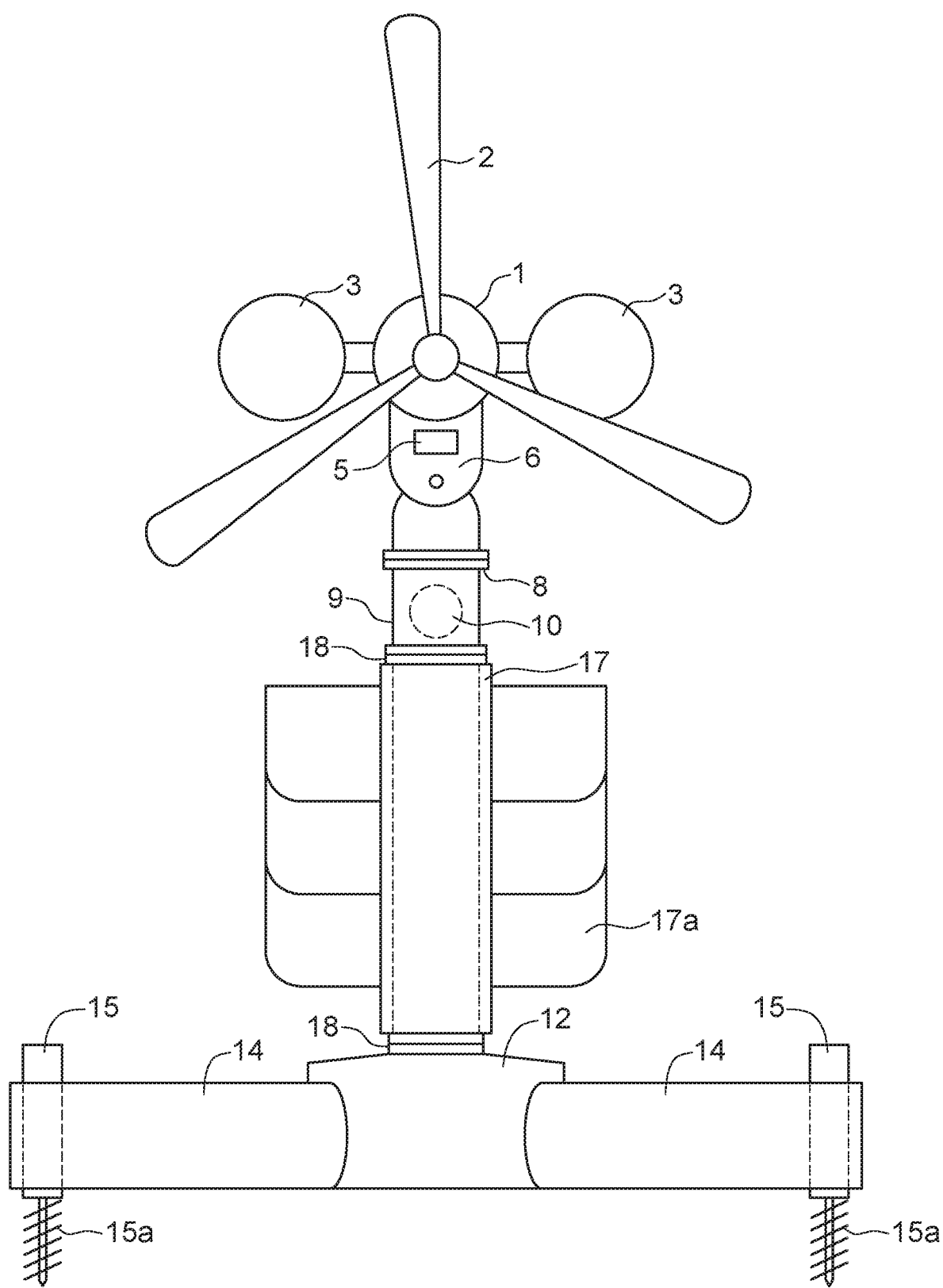
FIG. 7 is a front elevation view of the embodiment of FIG. 6;
(i)

There may be fluid control mechanisms such as one or more of a pump, lines, vents and valves to facilitate these foregoing operations of the submerge system, described further below and shown in FIG. 4. A pump 16, a valve 13, and a valve 14b may be provided, for example, disposed in one or more of the struts, or elsewhere. Valve 13 may be a two-way valve coupled to the pump 16, ballast tank 14a through conduit 14c, and tank 9c. Valve 14b may be disposed on a conduit between a first vent 14d of the ballast tank, and a vent 14e that has an opening on an exterior surface of the apparatus, for example on the hub.

One or more components, for example pump 16, valve 13 and valve 14b, may be shared in the submerge apparatus. In another embodiment, such components may be dedicated to one of the struts, and accordingly there may be more than one of such components for each ballast tank.

In one embodiment, augers 15a can be employed to propel the turbine into the submerged position. In such an embodiment, augers 15a may be configured to act as propellers to drive the apparatus downward. In particular, the augers can be operated by motor 15 as propellers to drive the struts, and the rest of the turbine, down toward and onto the sea floor. Once the augers reach the sea floor, they can continue to be operated and then act as drills for installing the turbine into engagement with the seafloor.

A positioning operation may be used to bring the apparatus to a desired location. During a positioning operation, the apparatus may be towed, by a vessel, to the desired location. Cable 11 may be paid out and/or retracted according to the length needed between shore station 19 and the apparatus. During positioning, the turbine may be floated, for example by use of the ballast system and/or the floats on the nacelle.

The turbine may be towed to a desired location in any number of positions, including one or more of a sideways position or an upright position. If the turbine is towed in the sideways position, the turbine may include the ballast tank and the air tank, to provide downward force which may thereby assist the augers, which may be acting as propellers. In such an embodiment, the flooded tanks lower the centre of gravity of the turbine and contribute to its stability when anchored. When the turbine is towed in the upright position, it may be submerged by use of its augers alone. In addition, the floats may keep the nacelle substantially above the tower and/or support assembly while being towed. If the apparatus did not include the floats, the nacelle may not have sufficient buoyancy to be supported above the tower and/or support assembly, and as such, when being towed, the nacelle may be beside or below the tower and/or support assembly.

A submerge operation may be used to cause the apparatus to submerge and be positioned on the seafloor. In one embodiment, during a submerge operation, valve 13 and valve 14*b* may open, and pump 16 may be activated to evacuate air from ballast tanks 14*a* through valve 13, reducing the pressure in the ballast tanks, thereby drawing in water and causing the apparatus to submerge. Valves 13 and 14*b* may be closed, and pump 16 may be deactivated.

To install the turbine in a position on the seafloor, augers 15*a* may be operated to drill into the seafloor. Motor 15 may drive auger 15*a* into the seafloor. A sensor coupled to the motor and/or auger and/or strut may be used to detect when the auger has fully embedded into the seafloor and may therefore be deactivated. For example a current meter may detect an increase in the current supplied to the motor, indicating that the motor is close to stalling, and therefore that the auger has successfully engaged the seafloor.

In one embodiment, submerging and auger engagement operations may be performed between low tide and high tide, when tidal forces are relatively less powerful. In the absence of any tidal stream, universal joint 6 and/or rotating joint 8 allow the nacelle assembly to adopt any position in the horizontal plane, and rotor 2 does not turn. When the tidal streams flow, hydrodynamic forces act on horizontal stabilizer 4*a* and vertical stabilizer 4*b*. This causes the nacelle assembly to pivot, as permitted by rotating joint 8 and/or universal joint 6, until the rotor faces the flow and the rotor will begin to turn. The nacelle floats may act to keep the nacelle assembly substantially above the tower assembly and support assembly.

In use, the underwater turbine may benefit from one or more hydrodynamic structures. The shape of the nacelle and the stabilizers of the nacelle, as permitted by the universal joint allow the rotor plane to face the direction of the tidal stream, thereby promoting the efficiency by which the generator may convert kinetic energy to electrical energy. The fairing may reduce the tower's drag and mitigate horizontal force on the tower. The fairing stabilizers may generate a downward force on the support assembly, and stabilize and/or anchor the apparatus. The augers and fairing stabilizers may avoid the need for a support structure that is commonly used to stabilize and/or anchor underwater turbines of the prior art.

If there is a desire to remove the turbine, a float operation may be used to cause the apparatus to float. In one embodiment, a float operation may include actuating the augers to detach from the seafloor. In particular, motor 15 may reverse drive auger 15*a* (for example, in a direction opposite to when the auger is drilling into a surface) to disengage the seafloor. Possibly, augers 15*a* may also be driven to act as propellers to propel the apparatus toward the surface of the water. In addition or alternatively, during a float operation, ballast tanks may be purged of water and replaced with air to cause the support assembly to become buoyant. Valves 14*b* and 13 may open, and pump 16 may be activated to allow tank 9*c* to direct high-pressure air into the ballast tank, forcing water out of vent 14*e*, causing the apparatus to float. Valves 14*b* and 13 may close, and pump 16 may be deactivated. Valve 13 may be a two-way valve. In a first position, valve 13 may allow pump 16 to draw air out of the ballast tanks and initiate submersion, as described herein. In a second position, valve 13 may allow compressed air from tank 9*c* to expel water from the ballast tanks, in the float operation described in this paragraph and elsewhere in this specification.

A computer, for example computer 9*a* or electronic interface 1*f*, may be configured to execute one or more instructions. Such instructions may be received from a command signal, for example over cable 11 (such as through an optical fiber in cable 11) from shore station 19, or may be triggered automatically. Such instructions may include: converting data from one or more of the sensors to a digital format for transmission to shore station 19; controlling the flooding of ballast tanks 14*a* by activating pump 16 and opening two-way valve 13 and valves 14*b*; controlling the egress of fluid from the ballast tanks with compressed air from tank 9*c* by activating two-way valve 13 and valves 14*b*; and controlling motor 15 to drive auger 15*a*. If the optical fiber is damaged, instructions for the floating operation of the turbine (which may be submerged and/or anchored) may be sent by an ultrasonic transmitter on a service vessel to ultrasonic sensor 1*d*.

CLAUSES

Clause 1. An underwater turbine apparatus, comprising: a nacelle assembly, including a nacelle, containing a generator; a rotor connected to a first end of the nacelle and in communication with the generator to cooperate therewith to convert kinetic energy to electrical energy; a float connected to the nacelle; and a stabilizer connected to the nacelle; a tower connected to the nacelle by a joint; a base with an upperside and an underside, the base supporting the tower in an operative position extending from the upperside; an auger having a long axis and being rotatable about the long axis, the auger protruding from the underside of the base; and a motor for driving the auger about its long axis, operable to drill the auger into engagement with an installation surface for the underwater turbine.

Clause 2. The apparatus of any one or more of clauses 1-21, further comprising: a fairing rotatably coupled to the tower by a fairing joint at each end of the fairing; and a fairing stabilizer coupled to the fairing.

Clause 3. The apparatus of any one or more of clauses 1-21, further comprising: a port on an exterior surface of the tower; and a cable configured to transmit electrical energy from the generator to a shore station, the cable connected at a first cable end to the port, and connected at a second cable end to the shore station.

Clause 4. The apparatus of any one or more of clauses 1-21, further comprising a submerge apparatus operable to submerge the underwater turbine apparatus.

Clause 5. The apparatus of any one or more of clauses 1-21, further comprising: a ballast tank; a vent with an opening on an exterior surface of the apparatus; an air tank for containing compressed air; a first valve for controlling fluid communication between the air tank and the ballast tank; a second valve for controlling fluid communication between the ballast tank and the vent; and a pump for pumping air out of the ballast tank to thereby draw water into the ballast tank.

Clause 6. The apparatus of any one or more of clauses 1-21, further comprising: a computer programmed to execute instructions, including, submerging instructions, including flooding the ballast tank by opening the first valve and the second valve, activating the pump, and thereby forcing air out of the ballast tank to draw water into the ballast tank, closing the first valve and the second valve, and deactivating the pump; and engaging the auger with a surface, the auger being driven by a motor; and floating instructions, including disengaging the auger with the surface, the auger being driven by the motor; filling the ballast tank with air by opening the first valve and the second valve, activating the pump to force air from the air tank into the ballast tank, thereby displacing water in the ballast tank, which escapes out of the vent, then closing the first valve and the second valve, and deactivating the pump.

Clause 7. The apparatus of any one or more of clauses 1-21, further comprising a rotor blade pitch control for adjusting a pitch angle of the blades of the rotor.

Clause 8. The apparatus of any one or more of clauses 1-21, further comprising a camera, the camera having a field of view oriented to capture a portion of the rotor.

Clause 9. The apparatus of any one or more of clauses 1-21, further comprising a pressure sensor for detecting changes in pressure in the nacelle.

Clause 10. The apparatus of any one or more of clauses 1-21, further comprising a temperature sensor for detecting a temperature of the nacelle.

Clause 11. The apparatus of any one or more of clauses 1-21, further comprising an accelerometer for detecting vibrations.

Clause 12. The apparatus of any one or more of clauses 1-21, further comprising a gyroscope for detecting one or both of an orientation of the nacelle and a direction of tidal streams.

Clause 13. The apparatus of any one or more of clauses 1-21, further comprising an ultrasonic sensor and transmitter for exchanging data between one or more sensors of the apparatus with one or both of the computer, and the shore station.

Clause 14. The apparatus of any one or more of clauses 1-21, wherein the ultrasonic transmitter is mounted on a service vessel and further comprising a communication link between the ultrasonic sensor and the ultrasonic transmitter.

Clause 15. A method for installing an underwater turbine apparatus, comprising rotating an auger, on the underwater turbine apparatus, to engage a seafloor.

Clause 16. The method of any one or more of clauses 1-21, further comprising evacuating air from the apparatus to submerge the apparatus.

Clause 17. The method of any one or more of clauses 1-21, wherein evacuating air includes flooding a ballast tank by opening a first valve and a second valve, activating a pump, and thereby forcing air out of the ballast tank to draw water into the ballast tank, closing the first valve and the second valve, and deactivating the pump.

Clause 18. The method of any one or more of clauses 1-21, further comprising operating the auger to propel the apparatus downward.

Clause 19. The method of any one or more of clauses 1-21, further comprising adjusting a pitch angle of blades of a rotor of the apparatus.

Clause 20. The method of any one or more of clauses 1-21, wherein adjusting is done over a period of time according to a tidal stream schedule.

Clause 21. The method of any one or more of clauses 1-21, wherein adjusting is done in response to a flow meter positioned on the nacelle configured to measure flow rates of tidal streams.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". It is understood that the words "upper", "lower", "above", "below", "horizontal", "vertical", "left," "right," etc., denote relative, illustrative positions, and elements described by such words may have any number of orientations despite the use of such words. All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. An underwater turbine apparatus, comprising:
   a nacelle assembly, including
      a nacelle, containing a generator;
      a rotor connected to a first end of the nacelle and in communication with the generator to cooperate therewith to convert kinetic energy to electrical energy;
      a float connected to the nacelle; and
      a stabilizer connected to the nacelle;
   a tower connected to the nacelle by a joint;
   a base with an upperside and an underside, the base supporting the tower in an operative position extending from the upperside;
   an auger having a long axis and being rotatable about the long axis, the auger protruding from the underside of the base; and
   a motor for driving the auger about the long axis, operable to drill the auger into engagement with an installation surface for the underwater turbine.

2. The apparatus of claim 1, further comprising:
   a fairing rotatably coupled to the tower by a fairing joint at each end of the fairing; and a fairing stabilizer coupled to the fairing.

3. The apparatus of claim 1, further comprising:
a port on an exterior surface of the tower; and
a cable configured to transmit electrical energy from the generator to a shore station, the cable connected at a first cable end to the port, and connected at a second cable end to the shore station.

4. The apparatus of claim 1, further comprising a submerge apparatus operable to submerge the underwater turbine apparatus.

5. The apparatus of claim 4, further comprising:
a ballast tank;
a vent with an opening on an exterior surface of the apparatus;
an air tank for containing compressed air;
a first valve for controlling fluid communication between the air tank and the ballast tank;
a second valve for controlling fluid communication between the ballast tank and the vent; and
a pump for pumping air out of the ballast tank to thereby draw water into the ballast tank.

6. The apparatus of claim 4, further comprising:
a computer programmed to execute instructions, including,
submerging instructions, including flooding the ballast tank by opening the first valve and the second valve, activating the pump, and thereby forcing air out of the ballast tank to draw water into the ballast tank, closing the first valve and the second valve, and deactivating the pump; and engaging the auger with a surface, the auger being driven by the motor; and
floating instructions, including disengaging the auger with the surface, the auger being driven by the motor; filling the ballast tank with air by opening the first valve and the second valve, activating the pump to force air from the air tank into the ballast tank, thereby displacing water in the ballast tank, which escapes out of the vent, then closing the first valve and the second valve, and deactivating the pump.

7. The apparatus of claim 1, further comprising a rotor blade pitch control for adjusting a pitch angle of the blades of the rotor.

8. The apparatus of claim 1, further comprising a camera, the camera having a field of view oriented to capture a portion of the rotor.

9. The apparatus of claim 1, further comprising a pressure sensor for detecting changes in pressure in the nacelle.

10. The apparatus of claim 1, further comprising a temperature sensor for detecting a temperature of the nacelle.

11. The apparatus of claim 1, further comprising an accelerometer for detecting vibrations.

12. The apparatus of claim 1, further comprising a gyroscope for detecting one or both of an orientation of the nacelle and a direction of tidal streams.

13. The apparatus of claim 1, further comprising an ultrasonic sensor and transmitter for exchanging data between one or more sensors of the apparatus with one or both of a computer, and a shore station.

14. The apparatus of claim 13, wherein the ultrasonic transmitter is mounted on a service vessel and further comprising a communication link between the ultrasonic sensor and the ultrasonic transmitter.

15. A method for installing an underwater turbine apparatus, comprising providing:
a nacelle assembly, including:
a nacelle, containing a generator;
a rotor connected to a first end of the nacelle and in communication with the generator to cooperate therewith to convert kinetic energy to electrical energy;
a float connected to the nacelle; and
a stabilizer connected to the nacelle;
a tower connected to the nacelle by a joint;
a base with an upperside and an underside, the base supporting the tower in an operative position extending from the upperside;
an auger having a long axis and being rotatable about the long axis, the auger protruding from the underside of the base; and
a motor for driving the auger about the long axis, operable to drill the auger into engagement with an installation surface for the underwater turbine; and rotating the auger, on the underwater turbine apparatus, to engage a seafloor.

16. The method of claim 15, further comprising evacuating air from the apparatus to submerge the apparatus.

17. The method of claim 16, wherein evacuating air includes flooding a ballast tank by opening a first valve and a second valve, activating a pump, and thereby forcing air out of the ballast tank to draw water into the ballast tank, closing the first valve and the second valve, and deactivating the pump.

18. The method of claim 15, further comprising operating the auger to propel the apparatus downward.

19. The method of claim 15, further comprising adjusting a pitch angle of blades of a rotor of the apparatus.

20. The method of claim 19, wherein adjusting is done over a period of time according to a tidal stream schedule.

21. The method of claim 19, wherein adjusting is done in response to a flow meter positioned on the nacelle configured to measure flow rates of tidal streams.

* * * * *